May 3, 1932.  W. J. COULTAS ET AL  1,856,468
DRAFT CONNECTION
Filed July 8, 1929   2 Sheets-Sheet 2
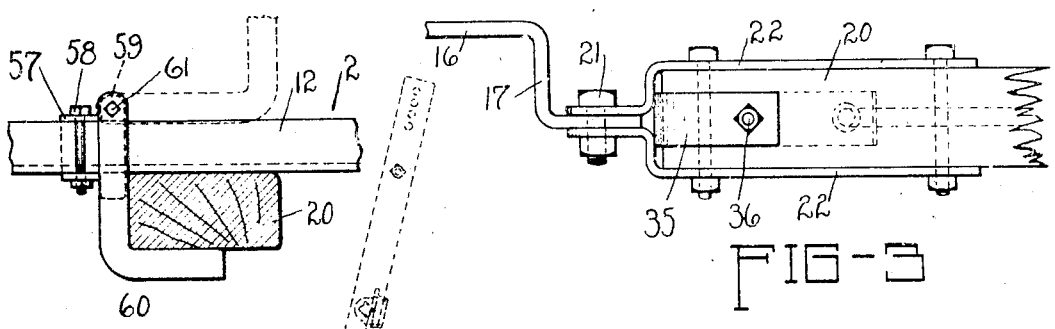
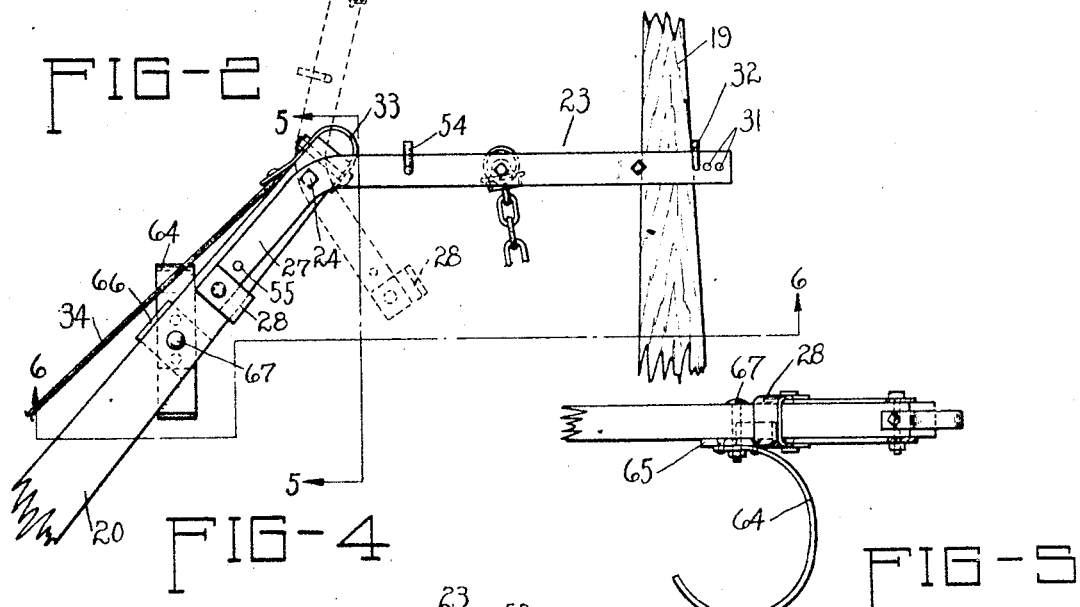
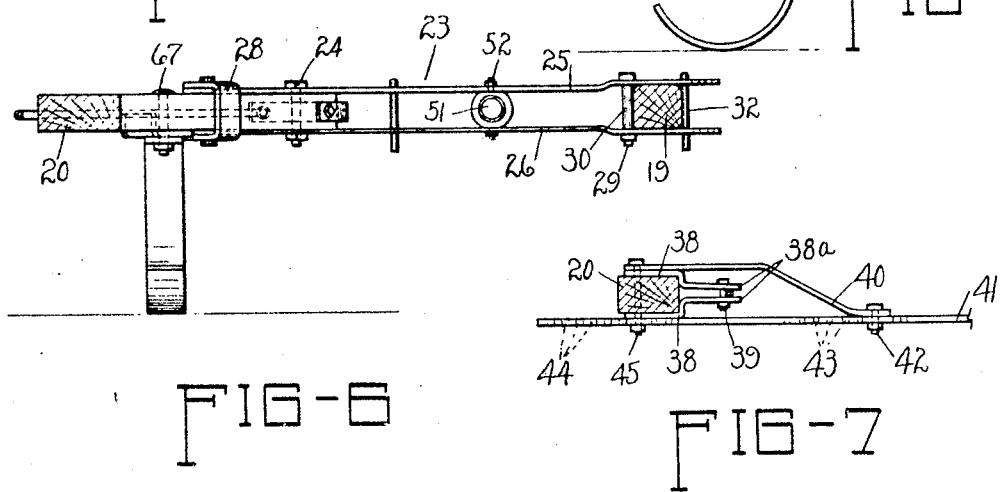
INVENTORS:
Wilbur J. Coultas
Carl J. Frederiksen.
BY Brown, Jackson, Boettcher & Dienner.
ATTORNEYS.
WITNESS
Walter Ackerman Patented May 3, 1932

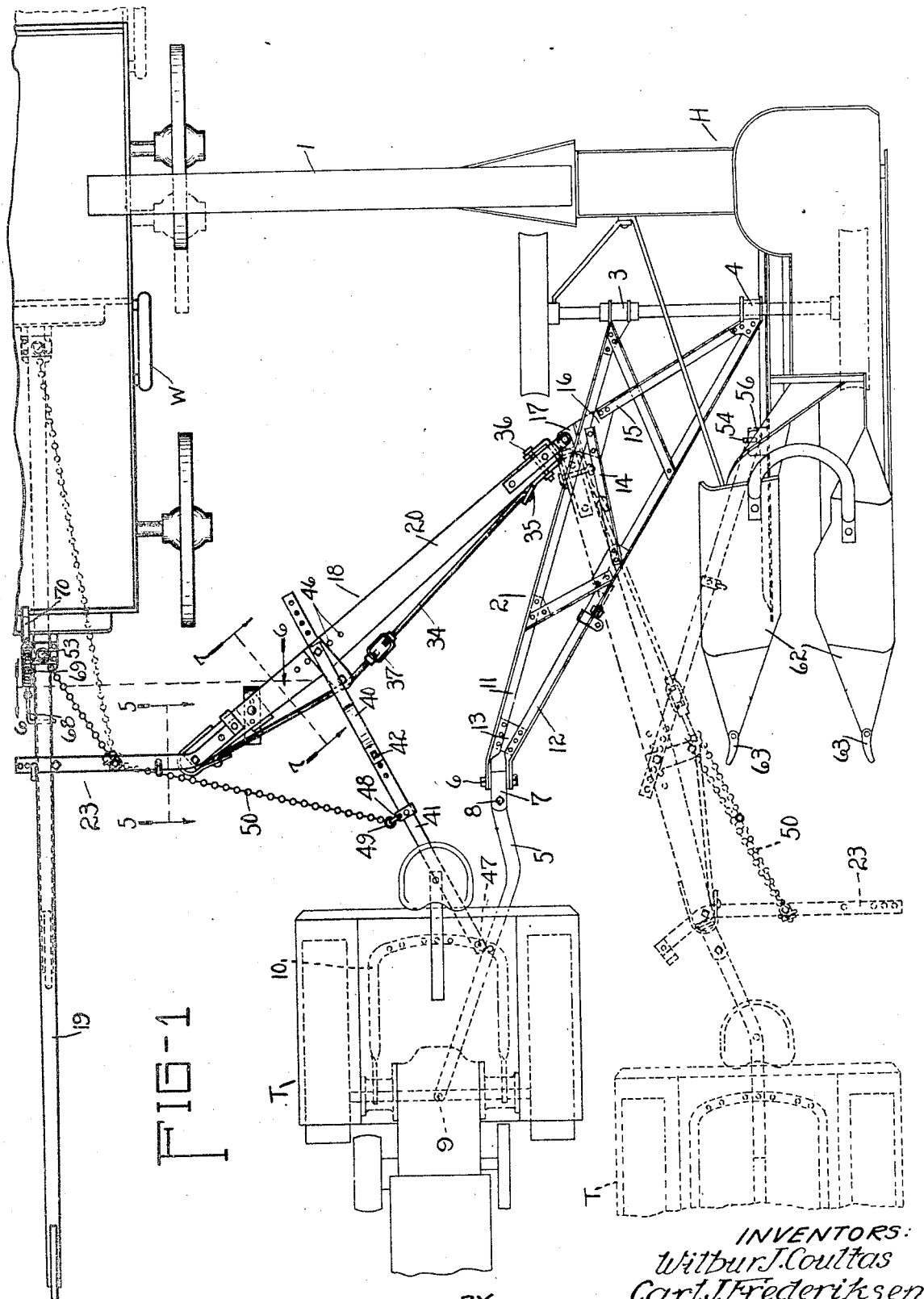

1,856,468

UNITED STATES PATENT OFFICE

WILBUR J. COULTAS AND CARL J. FREDERIKSEN, OF MOLINE, ILLINOIS, ASSIGNORS TO DEERE & COMPANY, OF MOLINE, ILLINOIS, A CORPORATION OF ILLINOIS

DRAFT CONNECTION

Application filed July 8, 1929. Serial No. 376,561.

This invention relates to draft connections, and more particularly to connections for hitching an agricultural implement and a wagon to a tractor.

It is known to provide draft connections of the character referred to which comprise a diagonally disposed beam connecting the draft member of the implement to the tongue of the wagon. Draft connections of this general type are disclosed in the copending application of Louis A. Paradise and Wilbur J. Coultas for draft connections, filed March 19, 1928, Serial No. 320,322. The instant invention is in the nature of an improvement over the draft connections disclosed in the copending application referred to.

In draft connections of this general character, with which we are familiar, the diagonal beam is connected to the tongue of the wagon in such manner that it is necessary to disconnect this beam and move the same to one side a considerable distance in order to permit of a draft animal being hitched to the wagon, at the beam side of the tongue, when the wagon has been loaded. Also in the existing draft connections with which we are familiar it is necessary, in order to effect desired fore and aft adjustment of the wagon, to vary the connections of several parts, which necessitates objectionable delay.

One of the main objects of our invention is to provide simple and efficient draft connections of the character stated in which the adjustment of the wagon into either one of its extreme fore and aft positions, or an intermediate position, can be effected expeditiously. Another object is to provide means whereby, when the wagon is loaded, a draft animal can be hitched thereto at the beam side of the tongue without necessity of moving the beam out of its normal diagonal position. A further object is to provide a beam so related to the draft member of the implement as to be movable into position, when disconnected from the wagon tongue, to be attached to the tractor for propelling the implement, the beam at this time being so disposed that the implement trails behind the tractor in substantial alignment therewith.

It is also an object of our invention to mount the beam in such manner that, when it is disposed for attachment to the tractor, it is also disposed beneath the draft member of the implement for supporting the same, means being provided for securing this draft member to the beam at this time so as to prevent tilting of the implement. A further object of our invention is to provide means whereby the effective side draft of the wagon for counter-acting the side draft of the implement can be varied to suit conditions. Further objects and advantages of our invention will appear from the detail description.

In the drawings:

Figure 1 is a plan view of a draft connection in accordance with our invention as applied, the position of the diagonal structure when attached to the tractor being shown in dotted line.

Figure 2 is a section on an enlarged scale taken through the beam when the diagonal structure is disposed for attachment to the tractor, as indicated by the dotted lines in Figure 1, and showing the bracket and hook for securing the draft member to the diagonal structure.

Figure 3 is a detail, on an enlarged scale, of the mounting of the inner end of the beam of the diagonal structure.

Figure 4 is a plan view on an enlarged scale, of the forward portion of the diagonal structure illustrating the position of the parts when the wagon is in its rearmost position, the wagon tongue being shown fragmentarily, the position of the extension member when disposed to permit attachment of a draft animal to the wagon being indicated by dotted lines.

Figure 5 is a section taken substantially on line 5—5 of Figure 4;

Figure 6 is a section taken substantially on line 6—6 of Figure 4;

Figure 7 is a section taken substantially on line 7—7 of Figure 1.

We have illustrated our invention as used for connecting a wagon W, and a corn harvester H, to a tractor T, and to each other. Our draft connection is particularly adapted for use with an agricultural implement and a wagon, in conjunction with a tractor, but it is to be understood that it is also adapted for use in connecting two vehicles or implements to a tractor in rear of and at opposite sides thereof, and is not restricted to use with a corn harvester and a wagon, which are illustrated by way of example. The corn harvester is illustrated semi-diagrammatically and comprises a laterally extending elevator 1, which serves to discharge the ears of corn, which have been removed from the stalks and husked in a known manner, into the wagon W. A draft member 2 extends forwardly from the harvester and is secured thereto, at 3 and 4, in a suitable manner. At its forward end, the member 2 is pivoted to drawbar 5 of the tractor on a horizontal axis, in a suitable manner as by means of a pin 6 passing through the forward end of member 2 and through a loop 7 at the rearward end of the draw bar, this loop being normally closed by a bolt 8.

The draw-bar is pivotally secured to tractor T at its forward end, at 9, and is secured to a U-shaped rack 10 carried by the tractor. This rack is provided with a plurality of spaced openings by means of which the drawbar may be adjustably secured to the rack by inserting a pin through an opening in the bar and through a selected opening of the rack. The manner of securing the draw-bar to the tractor is known in the art and need not be illustrated nor described in greater detail. The members 2 and 5 provide a direct draw connection between the harvester H and the tractor.

The draft member 2 is of triangular shape and comprises angle side rails 11 and 12 connected adjacent thier forward ends by a plate 13. These rails are connected by trusses and gusset plates, certain of these trusses, designated 14 and 15 being secured to a triangular gusset plate 16 which is suitably secured to rail 11 and projects laterally and outwardly beyond this rail. As will be noted more clearly from Figure 3, the outer portion of gusset plate 16 is bent downwardly and then outwardly to provide an L-shaped bracket 17, the lower horizontal arm of which is disposed appreciably below the body portion of plate 16.

A diagonal structure 18 extends forwardly from the draft member 2 and has its forward end suitably connected to steering tongue 19 of the wagon. This diagonal structure comprises a beam 20 which is pivotally mounted, at its rearward end, on the horizontal arm of bracket 17 by means of a pivot bolt 21 which passes through the terminal portions of straps 22 suitably shaped and secured about the end portion of beam 20 at the upper and lower faces thereof.

Beam 20 is thus mounted, at its rearward end, in such manner as to be capable of being swung about the pivot bolt 21 into the dotted line position of Figure 1, in which position this beam extends across member 2 and beneath the same, and is disposed in substantial alignment with the harvester H.

An extension member 23 is pivotally secured on a vertical axis to beam 20 adjacent the forward end thereof, by a pivot bolt 24. Referring more particularly to Figures 4, 5 and 6, this member comprises upper and lower arms 25 and 26, respectively, which may conveniently be formed of suitable lengths of strap metal, each of these arms being provided with an angularly disposed and rearwardly extending element 27. In the operative position of the extension member 23, the element 27 extends lengthwise of beam 20 at the upper and lower faces thereof. These elements are connected at their rearward end, by a stirrup 28 which fits about the rearward portion of beam 20 and serves to prevent rearward turning movement of the extension member about bolt 24 beyond operative position. The outer end portion of arms 25 and 26 are slightly offset to extend above and beneath the tongue 19 in contact therewith, as in Figure 4. A bolt 29 extends through the arm and a sleeve spacer 30 is disposed about this bolt and serves to properly space the outer ends of the arm for reception therebetween of the tongue.

The arms are provided, at their outer ends, with a series of aligned openings 31 for reception of a pin 32 provided at its upper end with an angularly disposed stop finger. This provides means for adjusting the pin to correspond to the width of the portion of the tongue 19 to which the member 23 is attached.

A clevis 33 is bolted or otherwise suitably secured to the forward end of the beam 20. A brace rod 34 is suitably secured to the forward arm of clevis 33, which is extended for this purpose. The other end of this rod is secured to a strap 35 which fits about the rearward end of beam 20 and is suitably secured thereto as by means of a bolt 36. A turnbuckle 37 is provided in the rod 34 for tensioning the same. At a point disposed forwardly of turnbuckle 37, rod 34 passes between two fingers 38a of a pair of plates 38 which seat on the upper and under faces of beam 20, the fingers being secured together by a bolt 39. The rod 34 is under tension and serves to brace the beam 20 against rearward stresses in a known manner.

A strap 40 extends forwardly from beam 20 and is secured, at its forward end, to a draft link 41, by means of a bolt 42. The link 41 is provided with a longitudinal series of openings 43 for reception of the bolt, and this link is also provided, at its rearward end portion, with a second longitudinally extending series of openings 44 for reception of a bolt 45 passing through strap 40, the tongue 20 and link 41.

We have illustrated this bolt as also passing through the two plates 38 for securing them to the beam. By reference to Figure 1, it will be noted that the beam is provided with a series of openings 46 spaced apart lengthwise thereof. The provision of the opening in link 41 provides simple and efficient means for adjusting the effective length of this link to suit conditions. The openings 46 in the beam 20 are of value as providing means for adjusting the point of connection between the beam and the link. In this draft connection the side draft of the wagon counter-acts the side draft of the harvester and the point of connection between the beam and the links 41 is the fulcrum point of the lever through which the side draft of the wagon acts on the harvester. The side draft of the wagon will vary considerably in accordance with conditions, such as differences in the ground surface, the condition of the soil, and other conditions which have to be taken into consideration. By providing this adjustable connection between the draft link 41 and the beam 20, it is possible to balance the side draft of the wagon against the side draft of the harvester in such manner that the one counteracts the other, and the tractor T is not subjected to objectionable side draft from either the wagon or the harvester. This is advantageous as facilitating operation of the entire assembly and assuring proper tracking of the harvester and the wagon so that the harvester will follow the corn row accurately and the wagon will be properly disposed for reception of the ears discharged from the elevator 1.

With the strap 40 and link 41 attached to beam 20 at the point illustrated, the bolt 45 can be employed for securing the plates 38 to the beam. When the strap and the link are attached to the beam at some other point, however, the bolt 45 is removed and a separate bolt is employed for securing the plate 38 to the beam.

Draft link 41 is secured at its forward end, at 47, to rack 10 of the tractor, in a suitable manner, as by means of a pin or bolt inserted through the link and through a selected one of the openings of the rack. This link provides a draft connection between beam 20 and the tractor. A hook 48 is secured to link 41 in advance of the series of openings 43. This hook is adapted for reception of a ring 49 at the forward end of a draft chain 50. This chain passes through an eye 51 pivotally mounted on a vertical axis, as by means of pivot pins 52, between arms 25 and 26 of the extension member 23. These pins are carried by lugs projecting forwardly from eye 51 and have their outer ends threaded for reception of securing nuts. The eye 51 is of proper interior diameter to permit free sliding movement therethrough of chain 50, but is of less interior diameter than the exterior diameter of ring 49. The rearward end of chain 50 is suitably secured to the wagon. This may be accomplished by inserting the usual king pin 53, normally used for attaching the double tree to tongue 19, through a ring or link at the rearward end of the chain, this pin also being inserted through the tongue in a known manner.

With the wagon in its forward position illustrated in Figure 1, the chain 50 provides a draft connection between the wagon and the extension member, in that the eye provides an abutment or bearing for the chain, as well as between the wagon and the link 41. When the wagon W, is in its most forward position illustrated in full lines in Figure 1, chain 50 is attached to hook 48, as illustrated in full lines. When the wagon is in its rearmost position, the chain is released from the hook and the ring 49 contacts eye 51, thus providing a direct draft connection between the wagon and the diagonal structure. To adjust the wagon in an intermediate fore and aft position, a pin may be inserted through arms 25 and 26 of the extension member, this pin being also inserted through a selected one of the links of the chain. Such a pin, designated 54, is carried in aligned openings through the arms of the extension member. In this manner, the point of connection between the draft chain and the diagonal structure can readily be adjusted in accordance with variation in the fore and aft position of the wagon. This is advantageous as rendering it possible to quickly and easily position the wagon in any one of a plurality of fore and aft positions so that the ears may be discharged from elevator 1 into the wagon at a plurality of points lengthwise thereof, successively, thus avoiding any necessity for leveling the load by hand which is necessary when the ears are discharged into the wagon at a single point only, or even at the front and rear thereof only.

The pin 54 is also available for insertion through an opening 55 in arm 25 of extension member 23, and through openings extending through beam 20 and the lower arm 26 and aligned with opening 55. When positioned in the opening 55, the pin 54 serves to hold the extension member 23 against forward movement about its pivot. This is not necessary when operating on level ground or when traveling up hill, but it is necessary when traveling down hill as otherwise the wagon would over-run the tractor and harvester.

It will be noted that the extension member 23 projects an appreciable distance beyond the forward end of beam 20. When the wagon W has been loaded it is removed by hitching a team of horses thereto. To permit of this being done with facility, pin 32 is removed and the kingbolt 53 is also removed, after which the extension member 23 is swung forwardly about bolt 24 into approximately the dotted line position of Figure 4. This provides ample space at the tractor side of tongue 19 for hitching of a draft animal to the wagon at this side of the tongue. The draft animals are hitched to the wagon by means of the usual doubletree and associated singletrees, the kingbolt 53 being employed for attaching the doubletree to the tongue. This renders it possible to hitch the draft animals to the wagon with a minimum of trouble and delay and without any necessity for shifting the position of the beam 20. After the loaded wagon has been removed, it may be replaced by an empty wagon which is drawn into position by draft animals attached thereto, after which the draft animals are unhitched from the wagon and the extension member 23 and chain 50 are again attached to the wagon in the manner previously described.

When transporting the harvester H from one scene of operations to another, it is desirable that the harvester trail behind the tractor in substantial alignment therewith. This is desirable for two reasons, first, because the harvester and the tractor when so relatively disposed occupy less road space than would be the case if the harvester were disposed an appreciable distance to one side of the tractor; secondly, the harvester trails the tractor better when disposed in substantial alignment therewith and objectionable lateral stresses are avoided. For transporting the harvester H, beam 20 is swung into position to extend beneath draft member 2 and forwardly thereof, as indicated by dotted lines. The link 41, which has previously been detached from the tractor T, is turned into the dotted line position of Figure 1, and has its rearward end secured to a bracket 56 suitably secured to the frame of harvester H, at the opposite side of draft member 2 from gusset plate 16. For securing the link to the bracket 56, pin 54 may be employed. The extension member 23 is then turned into the dotted line position of Figure 1, and draft chain 50 is looped about brace rod 34 and has its ends secured to this extension member. Beam 20 is then attached, by means of clevis 33, to draw-bar 5 of the tractor, this drawbar being disposed fore and aft of the tractor at this time. This provides a convenient and highly efficient hitch between the tractor and the harvester whereby the tractor pulls the harvester in alignment therewith.

Referring to Figure 2, it will be noted that draft member 2 rests upon the upper face of beam 20 when the latter is disposed for attachment to the tractor.

A U-shaped bracket 57 is secured by a bolt 58 about rail 12 of draft member 2. The upper arm of this bracket carries a projection 59 to which a hook 60 is pivoted at 61 on a horizontal axis. This hook is adapted for engagement about and beneath beam 20 for securing draft member 2 to the beam. In moving the beam into position for attachment to the tractor, it is swung in the direction of the harvester H, beyond the dotted line position of Figure 1. During this movement of the beam hook 60 is turned upwardly into the dotted line position of Figure 2, and is then swung downwardly into the full line position of this figure, after which the beam 20 is moved in a reversed direction so as to fit between the hook and rail 12, as in Figure 2, the beam at this time being disposed in the dotted line position of Figure 1. As will be noted more clearly from Figure 2, when the beam is disposed in the hook, the shank of the hook contacts the lower arm of bracket 57 so as to be held thereby against movement in a direction away from the beam. This provides simple and efficient means for securing draft member 2 to the beam in such manner as to be supported thereby and prevent objectionable fore and aft tipping of the harvester H. In this manner, the harvester is suitably supported, in transport, so as to hold the points at the forward end of shoes 62 out of contact with the ground surface, these points being designated 63. This is advantageous as eliminating possible injury to the points of the harvester shoes.

Referring more particularly to Figures 2, 4, and 5, a resilient supporting shoe 64 is provided adjacent the forward end of beam 20 for supporting the same. This shoe may conveniently be formed from a suitable length of strap iron bent into arcuate shape and riveted at its upper end to a plate 65 provided with an angularly disposed flange 66 which contacts the forward face of beam 20, this plate being secured to the beam in a suitable manner, as by means of a bolt 67. The shoe 64 serves as a ground contacting member for supporting the forward end of beam 20 and, to a certain extent, tongue 19 of the wagon. When the harvester is stored, beam 20 is disposed beneath and secured to draft member 2 as indicated in dotted lines in Figure 1 and as above described. At this time the shoe 64 serves to support the beam and draft member and to hold points 63 of the harvester out of contact with the supporting surface. When the beam 20 is in the full line position of Figure 1 and is connected to tongue 19 of the wagon, shoe 64 serves to prevent the tongue from digging into the ground when traveling over rough or uneven ground. We also preferably provide means for taking the greater part of the weight of tongue 19 off of the extension member 23. This means comprises a hook 68 which engages about and beneath tongue 19 and has its upper end secured to a tension spring 69, the upper end of which is secured to the wagon body in a suitable manner, as by means of a hook 70.

What we claim is:

1. In a draft connection between a tractor and an agricultural implement and a wagon disposed to one side thereof, a draft member connecting the tractor and the implement, a diagonal structure connecting said implement and the wagon, a link connecting said structure to the tractor, and means for establishing a draft connection between the wagon, and the link or said structure, optionally, to accommodate variation in the fore and aft position of the wagon.

2. In a draft connection between a tractor and an agricultural implement and a wagon disposed to one side thereof, a draft member connecting the tractor and the implement, a diagonal structure connecting the said implement and the wagon, a link connecting said structure to the tractor, a draft member connected to the wagon, and means for releasably attaching the draft member to said link, or to said structure, optionally, to accommodate variation in the fore and aft position of the wagon.

3. In a draft connection between a tractor and an agricultural implement and a wagon disposed to one side thereof and comprising a steering tongue, a draft member connecting the implement and the tractor, a diagonal structure comprising a beam connected at its rearward end to said member and an extension member projecting from the forward end of the beam and connected to said tongue, a bearing member carried by said extension member, a flexible draft member secured at its rearward end to the wagon, a link connecting the beam and the tractor, and means for securing the forward end of said flexible member to the link or the extension member, optionally, the flexible member being secured to the link and bearing on said bearing member in the forward position of the wagon, the flexible member being released from the link and secured to the extension member in the rearward position of the wagon, whereby variation in the fore and aft position of the wagon is accommodated.

4. In a draft connection between a tractor and an agricultural implement and a wagon disposed to one side thereof and having a steering tongue, a draft member connecting the implement and the tractor, a diagonal structure connecting said member and the wagon, a draft connection between said structure and the tractor, and a draft connection between the diagonal structure and the wagon, said diagonal structure comprising an extension member detachably secured to the tongue and mounted for separate movement independent of said diagonal structure away from the tongue when released therefrom and into position to leave a space at the adjacent side of the tongue for hitching of a draft animal to the wagon.

5. In a draft connection between a tractor and an agricultural implement and a wagon disposed to one side thereof and having a steering tongue, a draft member connecting the implement and the tractor, a diagonal structure comprising a beam connected at its rearward end to the implement and an extension member at the forward end of the beam and detachably connected to the tongue, said extension member being mounted on the beam for relative movement away from the tongue when detched therefrom, a draft connection between the beam and the tractor, and a draft connection between the wagon and said extension member.

6. In a draft connection between a tractor and an agricultural implement and a wagon disposed to one side thereof and having a steering tongue, a draft member connecting the implement and the tractor, a diagonal structure comprising a beam connected at its rearward end to the draft member and an extension member at the forward end of the beam and detachably connected to the tongue, said extension member being pivoted on the beam for turning movement forwardly away from the tongue when released therefrom, means preventing turning movement of the extension member rearwardly beyond operative position, a draft connection between the beam and the tractor, and a draft connection between said extension member and the wagon.

7. In a draft connection between a tractor and an agricultural implement and a wagon disposed to one side thereof and having a steering tongue, a draft member connecting the implement and the tractor, a diagonal structure comprising a beam connected at its rearward end to the draft member and an extension member at the forward end of the beam and detachably connected to the tongue, said extension member comprising a pair of arms pivoted to the beam on a horizontal axis and having rearwardly extending and angularly disposed elements extending along the beam, a stirrup carried by said elements and fitting about the rearward portion of the beam and preventing relative rearward movement of the extension member beyond operative position, means releasably securing the extension member of the tongue, a draft connection between the beam and the tractor, and a draft connection between said extension member and the wagon.

8. In draft means for connecting an agricultural implement and a wagon disposed at one side thereof to a tractor, a draft member connected to the implement and adapted for connection to the tractor, a structure pivoted at its rearward end to the draft member and adapted to be secured at its forward end to the tongue of the wagon in diagonal relation to said member at one side thereof, said structure when released from the wagon tongue being movable on its pivot into position to extend forwardly beyond the draft member in substantial alignment with said implement for attachment to the tractor, and means for providing a draft connection between said structure and the tractor when the structure is in its first position and between said structure and the implement when the structure is in its second position.

9. In draft means for connecting an agricultural implement and a wagon disposed to one side thereof to a tractor, a draft member connected to the implement and adapted for connection to the tractor, a structure connected to said member and movable relative thereto into either one of two operative positions, said structure in one position extending diagonally forward from one side of the draft member and being disposed for connection to the wagon and in its second position being disposed forwardly of the implement and in substantial alignment therewith for attachment to the tractor, and means for connecting said structure to the tractor in its first position and to the implement in its second position.

10. In draft means for connecting an agricultural implement and a wagon disposed to one side thereof to a tractor, a draft member connected to the implement and adapted for connection to the tractor, a structure connected to said member and movable relative thereto into either one of two operative positions, said structure in one position extending diagonally forward from one side of the draft member and being disposed for connection to the wagon and in its second position being disposed forwardly of the implement and in substantial alignment therewith for attachment to the tractor, means for connecting said structure to the tractor in its first position and to the implement in its second position, and means for securing the draft member to said structure when it is in said second position.

11. In draft means for connecting an agricultural implement and a wagon disposed to one side thereof to a tractor, a draft member connected to the implement and adapted for connection to the tractor, a structure pivoted to said member at one side thereof and movable relative thereto into either one of two operative positions, said structure in one position extending diagonally forward from said side of the draft member and being disposed for connection to the wagon and in its second position being disposed forwardly of the implement and in substantial alignment therewith for attachment to the tractor, and means for connecting said structure to the tractor in its first position and to the implement adjacent the other side of the draft member in its second position.

12. In draft means for connecting an agricultural implement and a wagon disposed to one side thereof to a tractor, a draft member connected to the implement and adapted for connection to the tractor, a structure pivoted to said member at one side thereof and movable relative thereto into either one of two operative positions, said structure in one position extending diagonally forward from said side of the draft member and being disposed for connection to the wagon and in its second position being disposed forwardly beneath the draft member and forwardly of the implement in substantial alignment therewith for attachment to the tractor, and means for connecting said structure to the tractor in its first position and to the implement adjacent the other side of the draft member in its second position.

13. In draft means for connecting an agricultural implement and a wagon disposed to one side thereof to a tractor, a draft member connected to the implement, a beam pivoted at its rearward end to said member at one side thereof and movable into either one of two operative positions relative to the draft member, the beam in one position extending diagonally forward from said side of the draft member and in its second position being disposed forwardly of the draft member for attachment to the tractor and in substantial alignment with the implement, means for attaching the forward end of the beam when in its first position to the wagon, and means providing a draft connection between the beam when in its first position and the tractor and between the beam when in its second position and the implement.

14. In draft means for connecting an agricultural implement and a wagon disposed to one side thereof to a tractor, a draft member connected to the implement, a beam pivoted at its rearward end to said member at one side thereof and movable into either one of two operative positions relative to the draft member, the beam in one position extending diagonally forward from said side of the draft member and in its second position being disposed forwardly of the draft member for attachment to the tractor and in substantial alignment with the implement, means for attaching the forward end of the beam when in its first position to the wagon, a draft link secured to the beam and adapted for attachment to the tractor in the first position of the beam, and means for attaching the link to the implement at the other side of the draft member in the second position of the beam.

15. In draft means for connecting an agricultural implement and a wagon disposed to one side thereof to a tractor, a draft member connected to the implement, a beam pivoted at its rearward end to said member at one side thereof and movable into either one of two operative positions relative to the draft member, the beam in one position extending diagonally forward from said side of the draft member and in its second position being disposed forwardly of the draft member for attachment to the tractor and in substantial alignment with the implement, means for attaching the forward end of the beam when in its first position to the wagon, a draft link pivoted to the beam and adapted for attachment to the tractor in the first position of the beam, means for attaching the link to the implement at the other side of the draft member in the second position of the beam, said beam in its second position extending beneath and across the draft member, and means for securing the draft member to the beam when the latter is in said second position.

16. In draft means for connecting an agricultural implement and a wagon disposed to one side thereof to a tractor, a draft member secured to the implement, a structure comprising a beam pivoted at its rearward end to the draft member and movable about its pivot to a position beneath the draft member, said beam in its latter position being connected to the tractor to serve as an auxiliary means for transmitting draft to the implement, and a supporting member depending from the beam and disposed to contact a supporting surface to support the beam and the superposed draft member when the beam is free from the wagon and the tractor.

17. In a draft connection between a tractor and an agricultural implement and a wagon disposed to one side thereof, a draft member connecting the tractor and the implement, a diagonal structure connecting said member and the wagon, a link connecting the structure to the tractor, a guide member carried by said diagonal structure, a draft chain passing through the guide member and secured at its rearward end to the wagon, means for releasably securing the forward end of the chain to the link, and means for adjustably securing the chain to the diagonal structure for varying the effective length of the chain.

18. In an agricultural machine embodying a tractor and two implements adapted to be drawn by the tractor in side by side relationship, a draft connection between the tractor and the implements comprising a member connected to one of the implements and adapted to be connected directly to the tractor and a second member pivotally connected with the first member and adapted to transmit draft to the second implement, said second member being adapted to swing about its pivotal connection with said first member to a point substantially directly forward of the first implement whereby the tractor can be connected to the forward end of said second draft member to draw the first implement when the second implement has been disconnected.

19. In an agricultural machine embodying a tractor and two implements adapted to be drawn by the tractor in side by side relationship, a draft connection between the tractor and the implements comprising a forwardly and laterally extending member connected to one of the implements and adapted to be connected to the tractor and a second member pivotally connected with the first member and adapted to transmit draft to the second implement, said second member being adapted to swing about its pivotal connection with said first member to a point substantially directly forward of the first implement, and means for rigidly holding said second member with respect to said first implement in said latter position, whereby the tractor can be connected to the forward end of said second draft member to draw the first implement when the second implement has been disconnected.

20. In a draft connection between a tractor and an agricultural implement and a wagon disposed to one side thereof, a draft member connecting the tractor and implement, a diagonal structure connecting said draft member to said wagon or to said tractor, optionally, to transmit draft to the wagon or implement, said diagonal structure when connected to the tractor being disposed below said draft member for supporting it while transmitting draft to the implement.

21. In a draft connection between a tractor and an agricultural implement and a wagon disposed to one side thereof, a draft member connecting the tractor and the implement, a diagonal structure between said implement and wagon, and means for connecting the diagonal structure to said draft member for transmitting draft to the wagon in normal operation of the implement, said diagonal structure being adapted to pivot on said means to a position beneath said draft member, whereby said diagonal member may be connected to the tractor to support said draft member while transmitting forward draft thereto.

In witness whereof, we hereunto subscribe our names this 3rd day of July, 1929.

WILBUR J. COULTAS.
CARL J. FREDERIKSEN.